(12) United States Patent
Merrill

(10) Patent No.: US 11,639,139 B2
(45) Date of Patent: May 2, 2023

(54) VEHICLE CAMERA ATTACHMENT PLATE

(71) Applicant: Wayne Merrill, Indianapolis, IN (US)

(72) Inventor: Wayne Merrill, Indianapolis, IN (US)

( * ) Notice: Subject to any disclaimer, the term of this patent is extended or adjusted under 35 U.S.C. 154(b) by 113 days.

(21) Appl. No.: 17/388,750

(22) Filed: Jul. 29, 2021

(65) Prior Publication Data

US 2023/0029865 A1 Feb. 2, 2023

(51) Int. Cl.
*B60R 11/04* (2006.01)
*H04N 23/57* (2023.01)
*B60R 11/00* (2006.01)

(52) U.S. Cl.
CPC ............. *B60R 11/04* (2013.01); *H04N 23/57* (2023.01); *B60R 2011/001* (2013.01); *B60R 2011/0052* (2013.01); *B60R 2011/0078* (2013.01)

(58) Field of Classification Search
CPC ............... B60R 11/04; B60R 2011/001; B60R 2011/0052; B60R 2011/0078; H04N 23/57
USPC ......................................................... 382/104
See application file for complete search history.

(56) References Cited

U.S. PATENT DOCUMENTS

| 2015/0084299 A1* | 3/2015 | Labout | A63C 17/26 280/87.021 |
| 2015/0191126 A1* | 7/2015 | Wadey | B60R 11/02 224/567 |

* cited by examiner

*Primary Examiner* — Allen C Wong
(74) *Attorney, Agent, or Firm* — C. John Brannon; Brannon Sowers & Cracraft PC

(57) ABSTRACT

A kit for facilitating the connection of a forward-facing video camera to an off-road vehicle, including a connection plate, wherein the connection plate further includes a first generally flat member for connecting to a vehicle, a second generally flat member oriented generally parallel with the first generally flat member, and a third generally flat member extending between and connecting the first and second generally flat members. A pair of spaced elongated apertures are formed through the first generally flat member and an aperture is formed through the second generally flat member. The kit further incudes a camera connector for operationally connecting to the second generally flat member, a plurality of threaded connecting members, a plurality of nuts, and a plurality of washers. At least some of the apertures are positioned to match preexisting bolt holes in the steering assembly of an off-road vehicle.

9 Claims, 7 Drawing Sheets

VEHICLE CAMERA ATTACHMENT PLATE

TECHNICAL FIELD

This specification relates generally to the field of mechanical engineering and, more specifically, to plate for attachment to a motorbike or quad runner to facilitate attachment of a camera for forward viewing during a race or other riding event.

BACKGROUND

Racers of motorbikes and/or quad runners enjoy being able to video record their races from a rider's point of view. Helmet mounted video cameras have become quite popular with racers. However, safety concerns with cameras engaging obstacles such as tree branches have provided impetus for finding different paces to mount cameras to achieve essentially the same experience. Further, the organizations governing dirtbike and quad runner racing have begun to establish rules banning helmet mounted cameras for these safety reasons. Thus, there is a need for a safer and more efficient method and apparatus for facilitating the attachment of a forward-facing camera to a motorbike and/or quad runner for making a visual record of a race or event from the rider's perspective.

The present novel technology addresses this need.

BRIEF DESCRIPTION OF THE DRAWINGS

Like reference numbers and designations in the various drawings indicate like elements.

DETAILED DESCRIPTION

Figure 1:
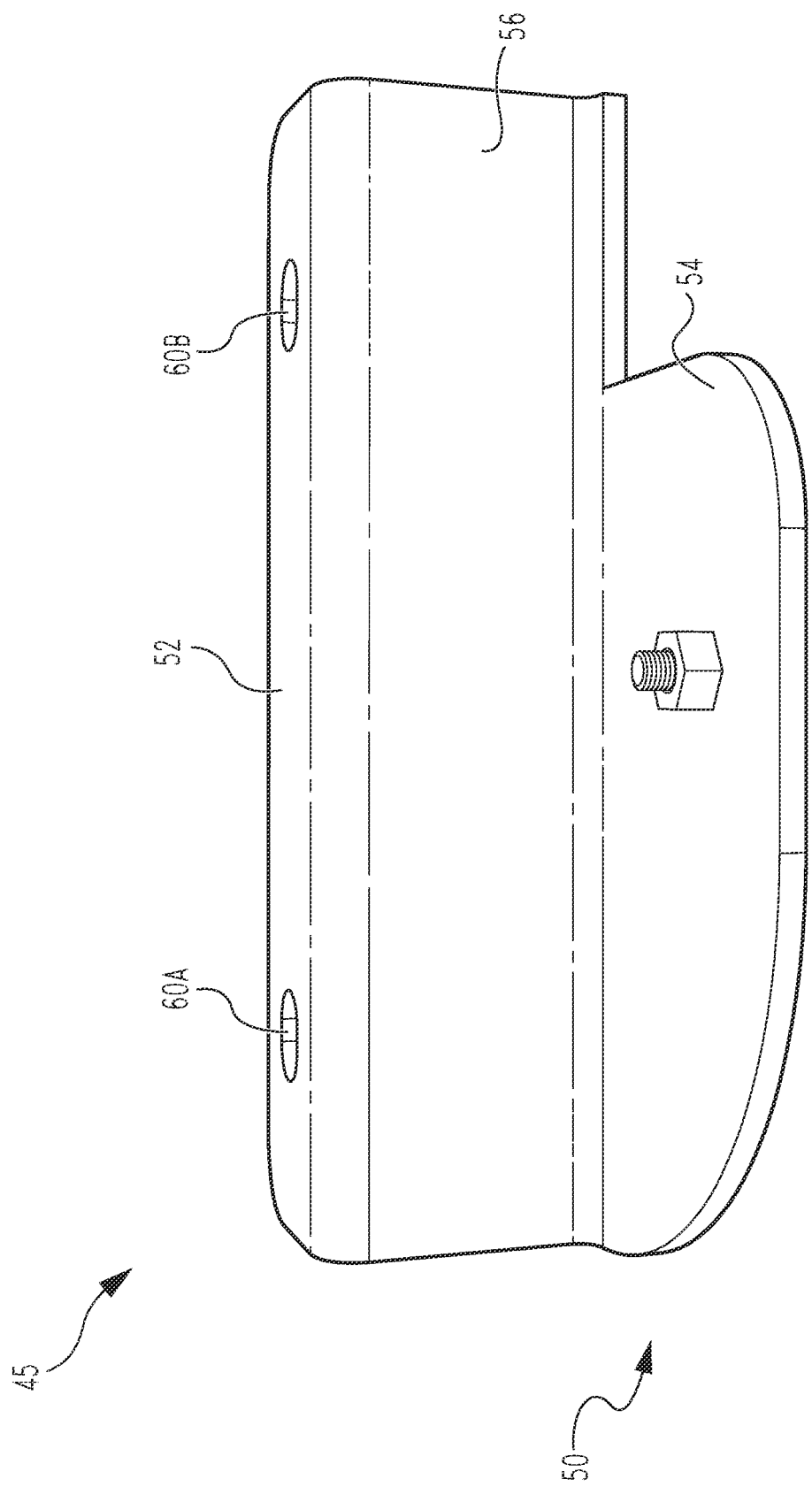
FIG. 1 depicts a first elevation view of a first embodiment camera connection assembly according to the present novel technology.

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often, though may not always, occur and that the description includes instances where said event or circumstance occurs and instances where it does not.

The details of one or more embodiments of the subject matter described in this specification are set forth in the accompanying drawings and the description below. Other features, aspects, and advantages of the subject matter will become apparent from the description, the drawings, and the claims.

In general, as illustrated in FIGS. 1-7, the present novel technology relates to a camera support or mounting plate assembly 45 for attachment to the steering or handlebar assembly of an off-road vehicle, such as a motor bike, a dirt bike, a quad runner, a three-wheeler, or the like. The assembly 45 includes a mounting plate 50 having a generally flat steering assembly engaging portion 52, a generally flat camera engaging portion 54 that is typically oriented parallel with the steering assembly engaging portion 52, and a support or spacer portion 56 extending therebetween.

The steering assembly engaging portion 52 includes a pair of spaced apertures 60A, 60B for mounting the plate 50 to the steering assembly of a bike or quad runner. For example, the apertures 52 may be spaced about four inches (ten centimeters) apart to accommodate the triple tree of a dirt bike. Apertures 52 are typically elongated to allow for some play in fitting an average steering assembly. Likewise, an aperture 62 is formed through the camera engaging portion 54.

A pair of threaded connectors 64 extend through respective apertures 60A, 60B to connect the plate 50 to a bike, quad runner, or the like. Nuts 66 are engaged on either side of the plate portion 52 to secure the plate 50 in place. Likewise, a threaded connector 66 extends through aperture 62 and is held in place by nuts 66 engaging the plate portion 54 from either side. Typically, washers 68 are engaged long with the nuts 66 to prevent loosening due to engine vibration and driving. A camera quick connector 70 may be engaged to one end of the threaded fastener 64 extending through the plate portion 54.

In operation, the plate 50 is connected to the triple tree or handle bar riser 80 via threaded connectors 64 extending through apertures 60A, 60B and threadedly engaging the triple tree/riser 80. Camera 85 is connected to plate 50 via direct threaded connection to a threaded connector 64 extending through aperture 62 or via connection to quick mount 70 operationally connected to threaded connector 64. During travel, shock and vibration are dampened by the spring character of the assembly 45 provided by spacer portion 56.

Figure 2:
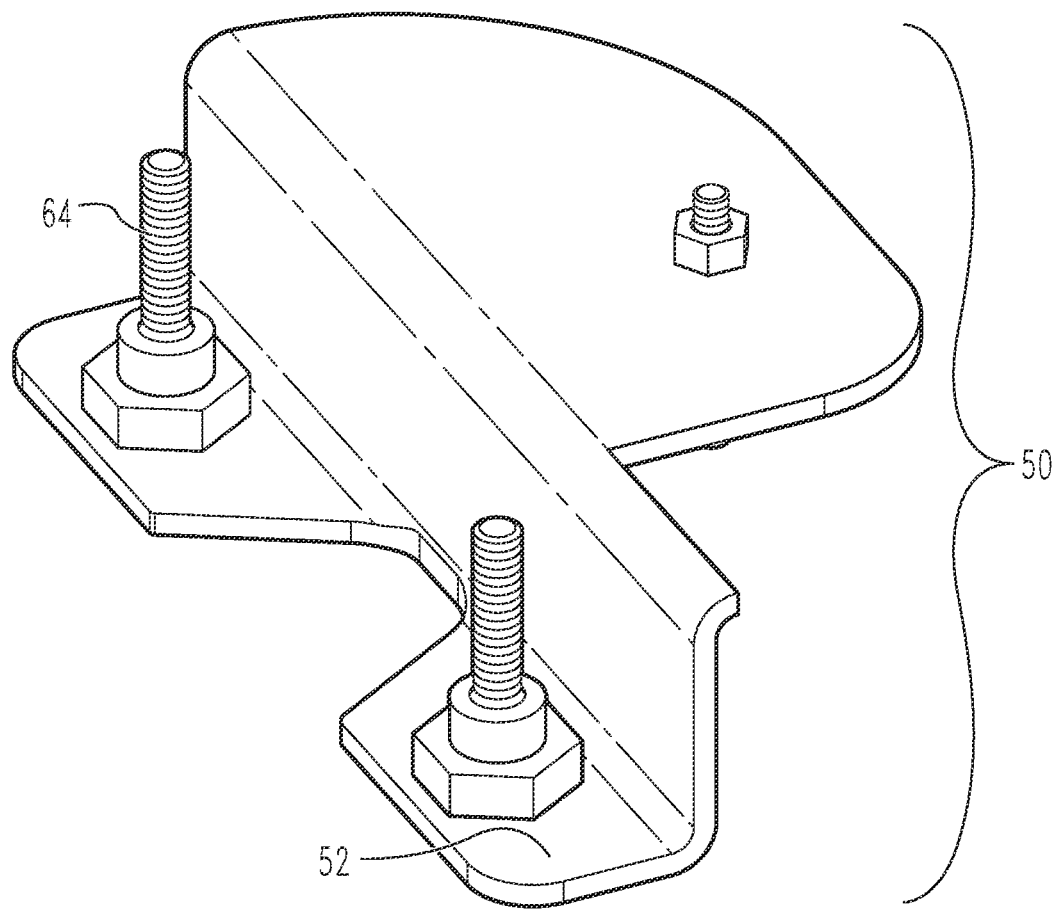
FIG. 2 depicts a first bottom perspective view of the camera connection assembly of FIG. 1.
Figure 3:
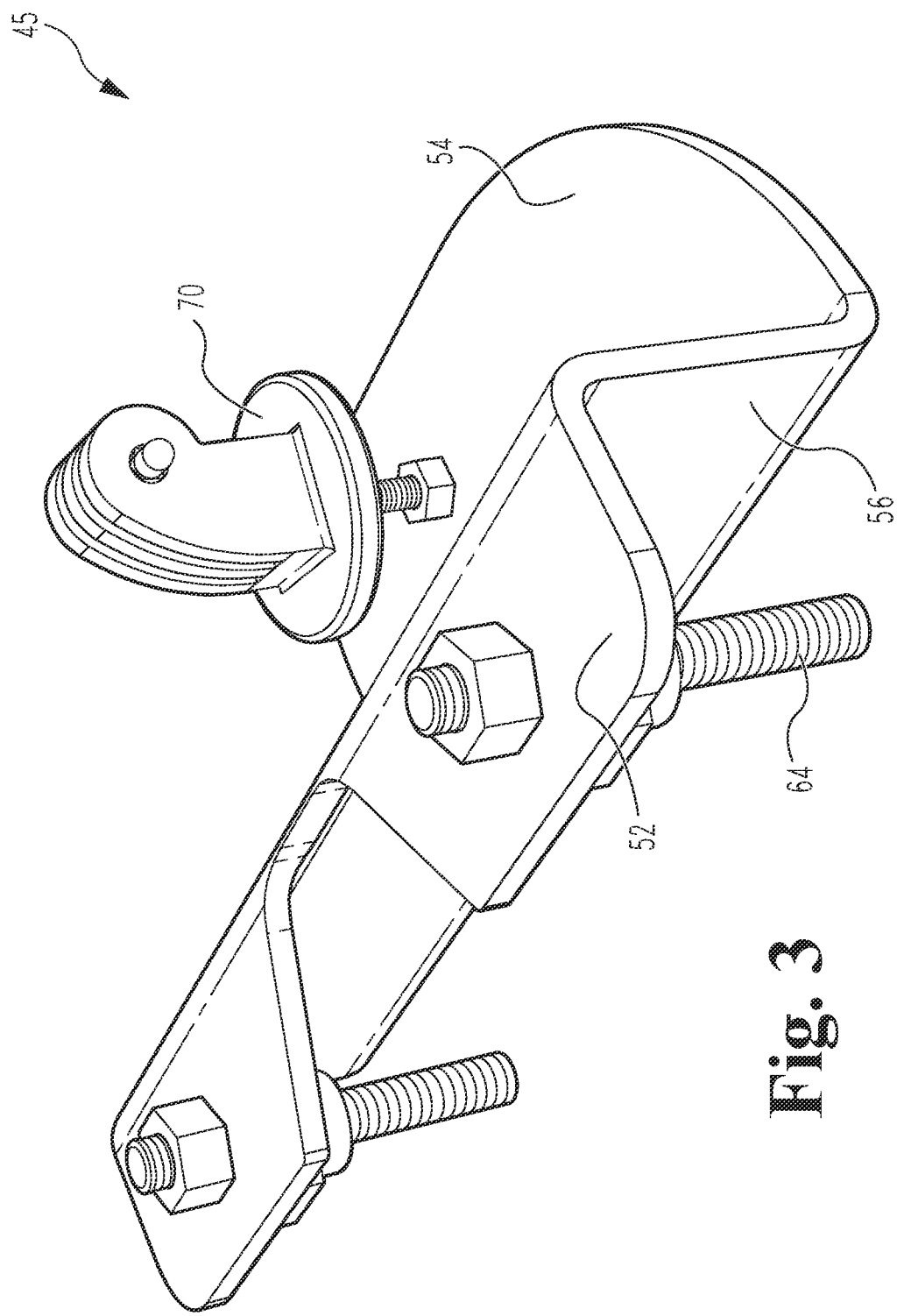
FIG. 3 depicts a second top perspective view of the camera connection assembly of FIG. 1.
Figure 4:
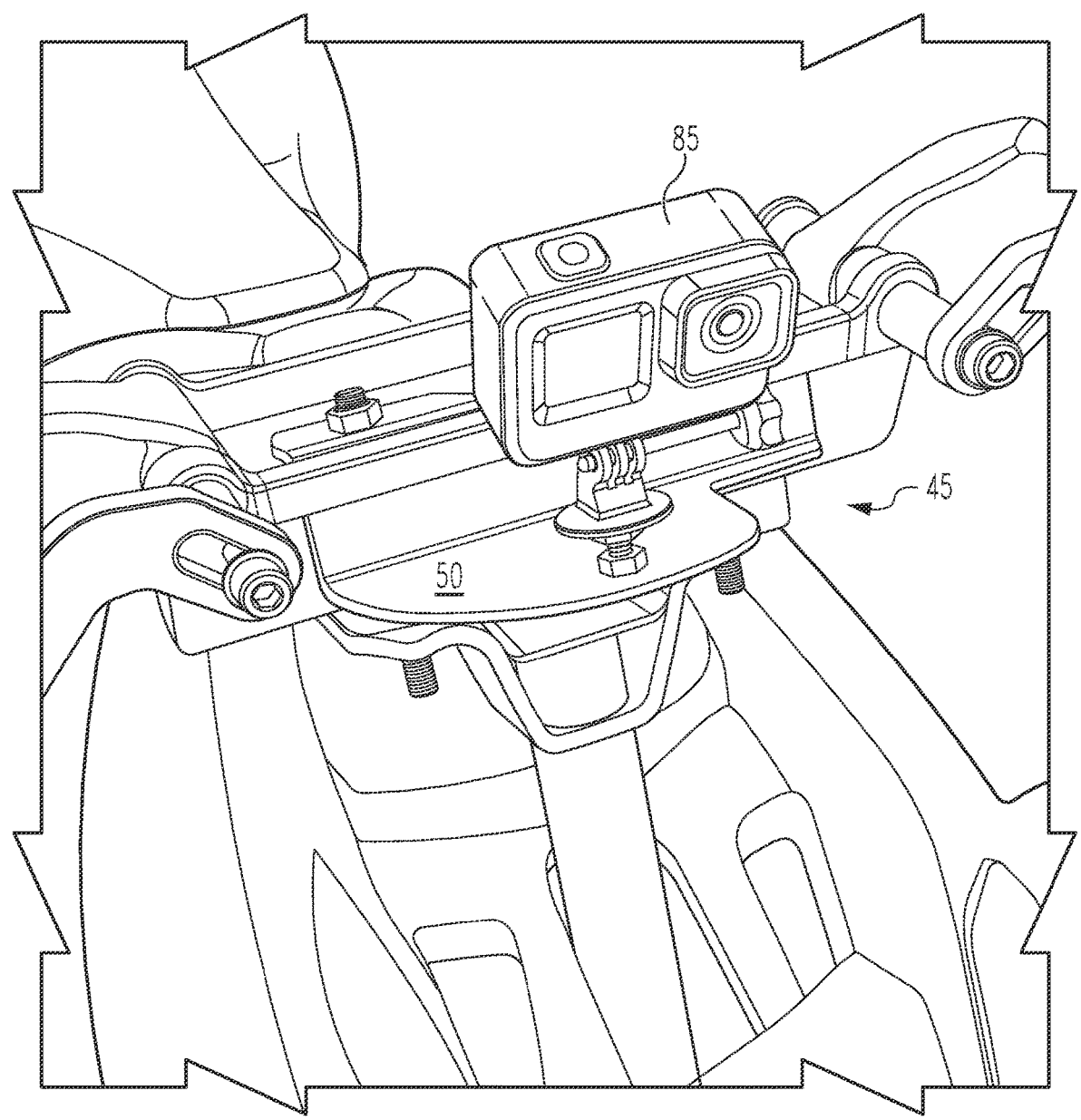
FIG. 4 depicts a first front perspective view of the camera connection assembly of FIG. 1 as connected to a motor bike.
Figure 5:
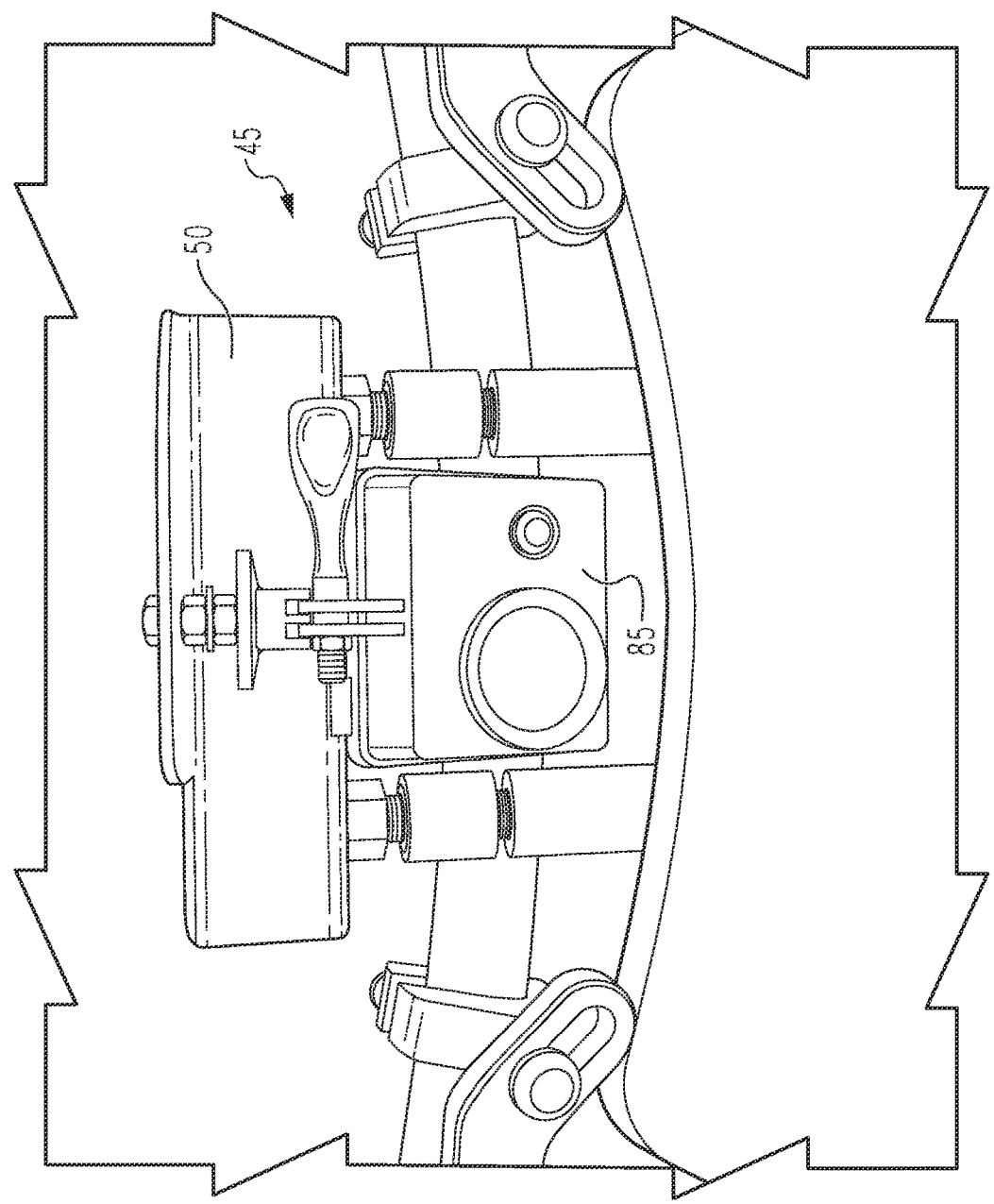
FIG. 5 depicts a second front perspective view of the camera connection assembly of FIG. 1 as connected to a motor bike.
Figure 6:
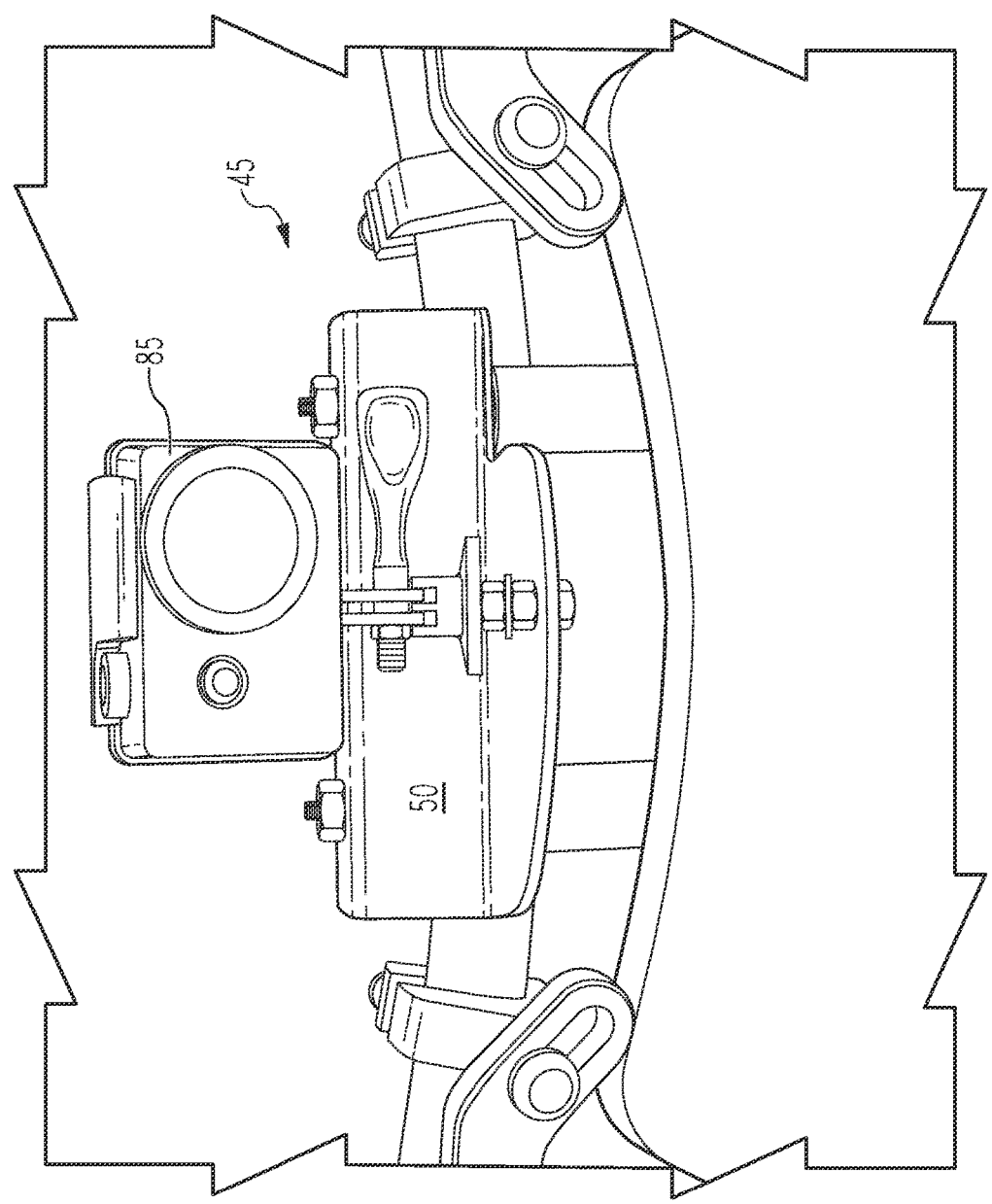
FIG. 6 depicts a third front perspective view of the camera connection assembly of FIG. 1 as connected to a motor bike.
Figure 7:
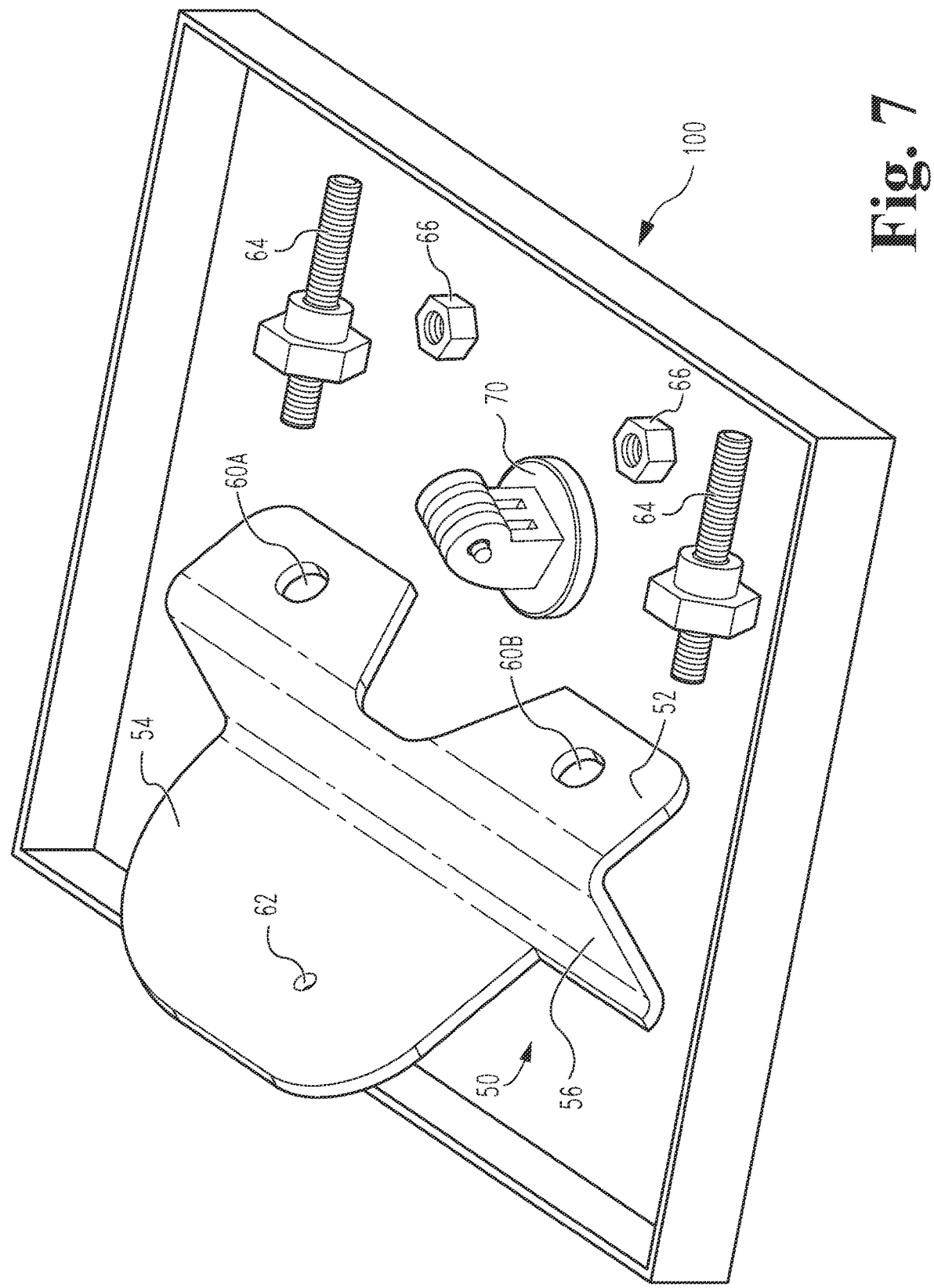
FIG. 7 depicts a kit including the camera connection assembly of FIG. 1.

FIGS. 1-7 depict various perspectives and embodiments associated with the instant novel camera attachment system 45, which typically may include structural base plate member(s) 50; camera quick or swivel connector(s) 70; threaded fasteners 64 and connection members 66, 68. Specifically, FIGS. 1-3 depict perspective, top, and bottom views of the present novel camera connection system 45, while FIG. 7 collects the various elements in kit form.

Apertures 60A, 60B are formed through plate member 52, typically positioned at or near the corners, for engaging a handle bar riser/triple tree 80 via bolts 64 inserted therethrough. The apertures 60A, 60B define predetermined patterns matching those of threaded, preexisting aperture patterns in riser/triple tree 80 designs. Bolts or double threaded fasteners 64 may be extended through the apertures 60A, 60B to threadedly engage an riser/triple tree 80, securing the plate 50 to the vehicle. Apertures 60A, 60B are typically elongated or oval, or may optionally be threaded.

While the various component parts 50, 64, 66, 68 are typically made of steel, one or more parts 50, 64, 66, 68 may be made partially or completely of any other convenient structural material, such as such as iron, aluminum, structural metal and/or alloys, plastic, ceramics, cermets, composites, combinations thereof, or other convenient structural materials, and/or the like.

The component parts 50, 64, 66, 68 may be provided as a kit 100.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A method for connecting a video camera to an off-road vehicle, comprising:
    operationally connecting a plate member to a handlebar riser, wherein the plate member further comprises:
        a first generally flat riser connecting portion;
        a pair of spaced elongated apertures positioned in the first generally flat riser connecting portion;
        a second generally flat camera connecting portion;
        a camera connector extending from the second generally flat camera connecting portion; and
        a spacer portion extending between the first generally flat riser connecting portion and the second generally flat camera connecting portion; and
    operationally connecting a video camera to the camera connector.

2. The method of claim 1, wherein the camera connector is a threaded member and wherein the video camera is threadedly connected to the camera connector.

3. The method of claim 1, wherein the camera connector is a quick connect and wherein the video camera is operationally connected to the camera connector.

4. A camera connection assembly for securing a video camera to an off-road vehicle, comprising:
    a first generally flat member for connecting to a vehicle;
    a second generally flat member oriented generally parallel with the first generally flat member;
    a third generally flat member extending between and connecting the first and second generally flat members;
    a pair of spaced elongated apertures formed through the first generally flat member;
    an aperture formed through the second generally flat member; and
    a camera connector operationally connected to the second generally flat member;
    wherein the pair of spaced elongated apertures are positioned to align with connecting members on standard handlebar risers.

5. The assembly of claim 4, wherein the camera connector is a threaded member and wherein the video camera is threadedly connected to the camera connector.

6. The assembly of claim 4, wherein the camera connector is a quick connect and wherein the video camera is operationally connected to the camera connector.

7. A kit for facilitating the connection of a forward-facing video camera to an off-road vehicle, comprising:
    a connection plate, wherein the connection plate further comprises:
        a first generally flat member for connecting to a vehicle;
        a second generally flat member oriented generally parallel with the first generally flat member;
        a third generally flat member extending between and connecting the first and second generally flat members;
        a pair of spaced elongated apertures formed through the first generally flat member;
        an aperture formed through the second generally flat member; and
        a camera connector for operationally connecting to the second generally flat member;
    a plurality of threaded connecting members;
    a plurality of nuts; and
    a plurality of washers.
    wherein at least some of the apertures are positioned to match preexisting bolt holes in the steering assembly of an off-road vehicle.

8. The kit of claim 7 wherein the steering assembly of an off-road vehicle is a triple tree.

9. The kit of claim 7 wherein the threaded connection members are bolts.

* * * * *